United States Patent [19]

Otsuki

[11] Patent Number: 4,462,828
[45] Date of Patent: Jul. 31, 1984

[54] POLISHING AGENT COMPOSITION

[75] Inventor: Masaaki Otsuki, Isesaki, Japan

[73] Assignee: General Electric Company, Waterford, N.Y.

[21] Appl. No.: 504,019

[22] Filed: Jun. 13, 1983

[30] Foreign Application Priority Data

Jul. 8, 1982 [JP] Japan ................................ 57-117718

[51] Int. Cl.³ .............................................. C09G 1/08
[52] U.S. Cl. .......................................... 106/3; 106/10;
106/287.12; 106/287.13; 524/763; 524/773;
524/863; 524/864; 528/34; 528/38
[58] Field of Search .......... 106/3, 10, 287.12, 287.13;
528/34, 38; 524/863, 864, 763, 773

[56] References Cited

U.S. PATENT DOCUMENTS

| | | | |
|---|---|---|---|
| 3,508,933 | 4/1970 | Yates | 106/10 |
| 3,544,498 | 12/1970 | Holdstock et al. | 106/3 |
| 3,814,710 | 6/1974 | Duncan | 524/763 |
| 3,836,371 | 9/1974 | Kokoszka | 528/34 |
| 3,890,271 | 6/1975 | Kokoszka | 528/34 |
| 3,960,575 | 6/1976 | Martin | 106/10 |
| 4,252,933 | 2/1981 | Sumida | 528/34 |
| 4,273,584 | 6/1981 | D'Angelo et al. | 106/3 |

Primary Examiner—Melvyn I. Marquis
Attorney, Agent, or Firm—Gary L. Loser

[57] ABSTRACT

A polishing agent composition containing a polyorganosiloxane preparation comprising:

(A) from 4 to 40% by weight of a benzene soluble polyorganosiloxane resin comprising:
(1) 70 to 100 mole percent $(R^1)_3SiO_{\frac{1}{2}}$ units, and
(2) 0 to 30 mole percent $(R^2)_2SiO$ units and having Si bonded $OR^3$ groups;

(B) from 55 to 95% by weight of a liquid linear or branched polyorganosiloxane terminated by $(HO)(R^4)_2SiO_{\frac{1}{2}}$ units or $(R^4)_3SiO_{\frac{1}{2}}$ units, and whose units other than the terminal units comprise 90 to 100 mole percent $(R^5)_2SiO$ units and 0 to 10 mole percent

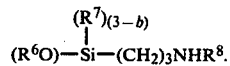

and, (C) from 1 to 5% by weight of an amino group-containing alkoxysilane represented by the general formula:

$$(R^6O)-\underset{\underset{(R^7)_{(3-b)}}{|}}{Si}-(CH_2)_3NHR^8.$$

11 Claims, No Drawings

POLISHING AGENT COMPOSITION

The present patent application claims priority of Japanese Patent Application Serial No. 117718/82, filed July 8, 1982.

BACKGROUND OF THE INVENTION

This invention relates to a polishing agent composition containing a polyorganosiloxane preparation comprising a benzene soluble polyorganosiloxane resin, a liquid polyorganosiloxane whose terminal groups are diorganohydroxysiloxy groups or triorganosiloxy groups, and an amino group-containing alkoxysilane. The polishing agent composition of the present invention forms a strong glossy film on the surface of a car body, furniture, etc., and particularly on painted or plated metal surfaces, to provide a polish which exhibits excellent durability and resistance to washing off.

It is a usual practice to add a silicone oil such as dimethylsilicone oil or methylphenylsilicone oil to a wax-based polishing agent composition for cars, etc., for the purpose of imparting desirable properties to the composition, that is, for the purpose of imparting a polishing effect or facilitating ease of application and wipe-off. Although improved workability and the desired improvement in polishing effect can be attained by the addition of such a silicone oil, there is still a drawback in that the durability of the polishing effect, particularly washing resistance, is poor. In other words, in washing a car or the like with water or a detergent, in general, the protective film made of the above-mentioned polishing agent is prone to separate easily and decrease the effectiveness of the properties imparted by the polishing agent, such as gloss, water repellency and surface smoothness. Accordingly, in the art, various studies are still being made for improving the durability and washing resistance of polishing agents.

One such study consists of the addition of an amino group-containing silicone oil to a polishing agent. This method is known to be able to provide a polishing agent excellent in durability and washing resistance (for example, Japanese Patent Publication No. 31874/1974) and has achieved some success commercially. However, such a polishing agent is disadvantageous in that it cannot give as bright a gloss as given by dimethylsilicone oil which is conventionally used and, because it contains amino groups in quantity, is susceptible to discoloration due to oxidation. Further, when combined with an acidic wax such as carnauba wax, its stability as a polishing agent is not sufficient owing to a chemical reaction with the amino groups contained in quantity.

In addition, when such a polishing agent is used after it is diluted with, for example, dimethylsiloxane oil in order to improve the above-mentioned disadvantages, the polishing agent is prone to show unsatisfactory durability, washing resistance, gloss or water repellency because of lowering in the film strength. As a result of attempts made to overcome the disadvantages of the above-mentioned amino group-containing silicone oil, a number of inventions have been made pertaining to, for example, processes including as an additive, an amido group-containing polyorganosiloxane, a carboxyl-functional siloxane, or a polymethylalkylsiloxane. At present, however, none of the polishing agents produced by these processes can provide a gloss with sufficient durability and washing resistance.

The present invention, as a result of studies by the applicant for letters patent, provides a polishing agent composition which has excellent durability, washing resistance, gloss and water repellency and which is free from the disadvantages of the above-mentioned amino group-containing silicone.

SUMMARY OF THE INVENTION

In accordance with the present invention there is provided a polishing agent composition containing a polyorganosiloxane preparation comprising:

(A) from 4 to 40% by weight of a benzene soluble polyorganosiloxane resin comprising $(R^1)_3SiO_{1/2}$ units and $SiO_2$ units and, optionally, containing from 0 to 30 mol % of $(R^2)_2SiO$ units and having Si-bonded $OR^3$ groups, wherein $R^1$ and $R^2$ represent the same or different substituted or unsubstituted monovalent hydrocarbon groups and $R^3$ represents a hydrogen atom or a monovalent hydrocarbon group of from 1 to 6 carbon atoms;

(B) from 55 to 95% by weight of a liquid linear or branched polyorganosiloxane whose terminal units consist of $(HO)(R^4)_2SiO_{1/2}$ units or $(R^4)_3SiO_{1/2}$ units and whose other units consist of from 90 to 100 mol % of $(R^5)_2SiO_{1/2}$ units and the balance of $(R^5)_aSiO_{(4-a)/2}$ units (where a represents 0 or 1), wherein $R^4$ and $R^5$ represent the same or different substituted or unsubstituted monovalent hydrocarbon groups, and (C) from 1 to 55% by weight of an amino group-containing alkoxysilane represented by the general formula:

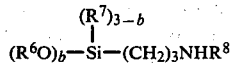

wherein $R^6$ represents an alkyl group of from 1 to 4 carbon atoms, $R^7$ represents a substituted or unsubstituted monovalent hydrocarbon group, $R^8$ represents a hydrogen atom or an amino group-terminated aminoalkyl group of from 1 to 10 carbon atoms and b represents 2 or 3.

DESCRIPTION OF THE INVENTION

Component (A), used in this invention together with components (B) and (C), can impart polishing agent durability, washing resistance, gloss and water repellency. It is usually utilized as a solid resin product, although it is also possible to use the resin product in the form of a solution in benzene, toluene, mineral spirit or the like for ease of handling. In the above formulas $R^1$ and $R^2$ may be the same or different monovalent hydrocarbon groups. Examples of the substituted or unsubstituted monovalent hydrocarbon groups include alkyl groups such as methyl, ethyl, propyl and butyl; alkenyl groups such as vinyl; aryl groups such as phenyl; a chloromethyl group and a chlorophenyl group. Most preferably $R^1$ and $R^2$ are methyl groups for the sake of the properties of the polishing agent and advantages in the synthesis of component (A). As the Si-bonded $OR^3$ group, there is selected a hydrocarbon group or an easily hydrolyzable alkoxy group containing a monovalent hydrocarbon group of from 1 to 6 carbon atoms, such as methoxy, ethoxy, propoxy or butoxy, and the $OR^3$ groups may be the same or different from each other. The amount of the $(R^1)_3SiO_{1/2}$ units per mol of the $SiO_2$ units is preferably in the range of from 0.4 to 1.0:1 and particularly preferably in the range of 0.5 to 0.8:1. If the amount is less than 0.4 mol, it is difficult to obtain a stable benzene-soluble resin and the formed resin is apt to become of unfavorably highmolecular weight and form an insoluble, infusible, gel-like matter during synthesis or storage. If the amount exceeds 1.0 mol $(R^1)_3SiO_{1/2}$ per mol $SiO_2$, the durability and washing resistance of gloss and water repellency of the surface coated with such a polishing agent tends to become insufficient. Further, component (A) may contain from 0 to 30 mol %, based on the total of $(R^1)_3SiO_{1/2}$ and $SiO_2$ units of $(R^2)_2SiO$ units in addition to the $(R^1)_3SiO_{1/2}$ and $SiO_2$ units. As examples of the Si-bonded $R^2$, there can be mentioned those mentioned for $R^1$. The polyorganosiloxane resin (A) can be prepared usually in the form of a solution by cohydrolyzing a tetrafunctional silicon compound selected from the group consisting of an alkyl silicate such as ethyl silicate or propyl silicate, its partial hydrolyzate, silicon tetrachloride and water glass with a triorganochlorosilane such as trimethylchlorosilane, dimethylvinylchlorosilane or dimethylphenylchlorosilane and, if necessary, a diorganodichlorosilane such as dimethyldichlorosilane, methylvinyldichlorosilane or methylphenyldichlorosilane in the presence of a solvent and removing the by-products by a usual means. As a solvent there may be used hydrocarbons such as benzene, toluene, xylene, white gasoline and mineral spirits. Where contamination with such a solvent is undesirable it is possible to obtain a solid resin product by suitably carrying out solvent removal. If necessary component (A) can also be used in the form of a solution in a liquid polyorganosiloxane such as dimethylsilicone oil, methylphenylsilicone oil or methylvinylsilicon oil mentioned for component (B).

Component (B), used in this invention together with components (A) and (C), can impart a polishing agent workability and gloss peculiar to silicones. It is a linear or slightly branched liquid polyorganosiloxane containing an $(R^5)_2SiO$ unit as the principal unit and falls in the category of a so-called silicone oil. As the terminal groups, there can be mentioned a triorganosiloxane group or a diorganohydroxysiloxy group. It is also possible to use a polyorganosiloxane which contains one or both of them or to use a mixture of such polyorganosiloxanes. When the content of polyorganosiloxane blocked with diorganohydroxysiloxy terminal groups is high, the film of the polishing agent has excellent strength and the durability and washing resistance of gloss and water repellency become particularly excellent. Furthermore, when the content of polyorganosiloxane blocked with triorganosiloxy terminal groups is high, the workability in application of a polishing agent becomes excellent, and it becomes possible to further increase the gloss peculiar to silicone. However, there is a tendency that the higher the triorganosiloxy content is, the lower the durability and washing resistance are as compared with the case where the polyorganosiloxane is blocked with diorganohydroxysiloxy terminal groups. To utilize both of their merits it is preferred to use a mixture of the polyorganosiloxane blocked with triorganosiloxy terminal groups and the polyorganosiloxane blocked with diorganohydroxysiloxy terminal groups. However, even in the case where the polyorganosiloxane blocked with triorganosiloxy terminal groups is used alone, it is apparent from the examples of this invention that considerable durability and washing resistance of gloss and water repellency can be obtained.

The $R^4$ groups may be the same or different from each other and include, for example, alkyl groups such as methyl, ethyl, propyl, butyl, hexyl, decyl and dodecyl; alkenyl groups such as vinyl and allyl; aralkyl groups such as phenethyl and B-phenylpropyl; and aryl groups such as phenyl and chlorophenyl. However, because of the availability of an intermediate material and the ease of synthesis, it is preferred that at least two of the $R^4$ groups bonded to one silicon atom be methyl groups. The $R^5$ groups may be the same or different from each other and include, for example, a substituted or unsubstituted monovalent hydrocarbon group mentioned for $R^4$, but it is preferred that $R^5$ be a methyl or a phenyl group. It is particularly preferred that substantially all of the $R^5$ groups be methyl groups for the sake of ease of synthesis, easy spreading of the polishing agent during application, good workability, good gloss and the like. Of the structural units of component (B), from 90 to 100 mol % of the siloxy units other than the terminal groups consist of such $(R^5)_2SiO$ units and the balance of the siloxy units may be $R^5SiO_{3/2}$ and $SiO_2$ units. In order to obtain a product of a controlled viscosity easily, a linear polydiorganosiloxane consisting of substantially 100 mol % of the $(R^5)_2$ units is preferred, but the presence of the $R^5SiO_{3/2}$ or the $SiO_2$ units in an amount of up to 10 mol % has no particular adverse effect upon the properties of the composition of this invention. When the amount of the $R^5SiO_{3/2}$ or the $SiO_2$ units exceeds 10 mol %, it becomes somewhat difficult to prepare the liquid product in a well-controlled condition. The viscosity of this liquid product is not required to be of a particular value, but usually it is selected from the viscosity (at 25° C.) range of from 10 to 10,000 cSt. When component (B) is a mixture, it is preferable that the liquid polyorganosiloxane having both of its terminal groups blocked with diorganohydroxysiloxy groups has a viscosity selected from the range of from 100 to 1,000,000 cSt, and that the liquid polyorganosiloxane having both of its terminal groups blocked with triorganosiloxy groups has a viscosity selected from the range of from 2 to 10,000 cSt, and that the viscosity of component (B) as a whole falls in the above-mentioned range of from 10 to 10,000 cSt.

Component (C) of this invention is a compound which, when combined with components (A) and (B) crosslinks these components to form a high-molecular weight product. This further improves the strength and adhesion of the glossy film by improving the affinity for the surface to which the polishing agent is applied and provides the durability and washing resistance of gloss and water repellency and which is usually and aminofunctional silane coupling agent. In the formula $R^6$ is selected from the group consisting of alkyl groups of from 1 to 4 carbon atoms, such as methyl, ethyl, propyl and butyl, and $R^7$ is selected from the group consisting of monovalent hydrocarbon groups such as alkyl groups mentioned for $R^6$; alkenyl groups such as vinyl and allyl; and aryl groups such as phenyl and chlorophenyl. $R^8$ represents a hydrogen atom or an amino group-terminated aminoalkyl group of from 1 to 10 carbon atoms such as β-aminoethyl or γ-aminopropyl. Among the amino-functional silanes γ-aminopropyltriethoxysilane, N-β-(aminoethyl)γ-aminopropyltrimethoxysilane and N-(dimethoxymethylsilylpropyl)ethylenediamine are exemplary of compounds which can be suitably used in this invention. These compounds may be used alone or as a combination of at least two compounds.

The amounts of components (A), (B) and (C) are selected so as to provide a polishing agent having the most suitable durability and washing resistance of gloss and water repellency and they are selected from the range of from 4 to 40% by weight for component (A), from the range of from 55 to 95% by weight for component (B) and from the range of from 1 to 5% by weight for component (C). As the relative amounts of components (A) and (C) increase film strength and an affinity for the surface to which the agent is applied become high and the durability and washing resistance as a polishing agent becomes still better. However, from the viewpoint of the storage stability of the polyorganosiloxane composition and of the workability during application of a polishing agent, it is necessary that the amounts are selected so as to fall in the above-mentioned ranges. In consideration of a balance among the above-mentioned properties the most suitable composition of this invention is in the range of from 10 to 20% by weight of component (A), from 76 to 88% by weight of component (B) and from 2 to 4% by weight of component (C).

In the formation of the polyorganosiloxane preparation of this invention it is effective to add component (C) to a mixture prepared by dissolving or uniformly dispersing component (A) in component (B). It is not a desirable method to add component (C) only to component (A) prior to the addition of component (B), because when the mixture is left standing for a long time the two components react with each other and form an insoluble, infusible, gel-like matter before component (B) is added.

The production of the polishing agent composition of this invention is carried out according to a conventional method of producing a polishing agent. Namely, solid or paste polishing agents can be produced by adding the polyorganosiloxane preparation of this invention to a mixture containing principal components consisting of a mineral, vegetable or animal wax such as carnauba wax, beeswax or montan wax, a petroleum wax or synthetic wax such as solid paraffin, microcrystalline wax or synthetic wax such as solid paraffin, microcrystalline wax, polyethylene wax or an oxidized wax derived therefrom, and a solvent such as mineral spirit, mineral turpentine, kerosene or white gasoline and, if necessary, additives such as an abrasive, perfume, coloring matter and the like, and after heating and melting, gradually cooling the resulting mixture to room temperature. Emulsion type polishing agents can be obtained by employing water and the polyorganosiloxane preparation of this invention together with the above-mentioned solvent, waxes and additives such as an abrasive in the presence of a surface active agent. Here it is possible to obtain the polishing agent in either of oil-in-water or water-in-oil emulsion types by suitably selecting the surface active agent and other components being added. The amount of the polyorganosiloxane preparation of this invention is usually from 0.1 to 20% by weight, preferably from 1 to 10% by weight based on the total weight of the polishing agent because when it is less than 0.1% by weight no effect is obtained by the addition of the preparation of this invention whereas even when it exceeds 20% by weight an effect corresponding to the amount of addition cannot be expected and this is economically disadvantageous.

This invention can provide a polishing agent which can impart a gloss and water repellency unique to silicones to various substrates, particularly coated or plated metal surfaces and which is excellent in the durability and washing resistance of gloss and water repellency as compared to conventional polishing agents and which, because of its amino content smaller than those of conventional amino-functional silicone oils, is freed from a defect such as viscosity drop due to the reaction with wax. This invention can provide a polishing agent composition which is particularly useful as a car polishing agent.

The invention will now be described with reference to examples thereof wherein all the amounts are parts by weight and the viscosity is measured at 25° C.

REFERENTIAL EXAMPLE

A 50% xylene solution (R-1) of a polymethylsiloxane resin consisting of $(CH_3)_3SiO_{1/2}$ and $SiO_2$ units (the molar ratio between the units being 0.6) and having Si-bonded hydroxyl groups was prepared. In the same manner a 50% xylene solution (R-2) of a polymethylsiloxane resin consisting of $(CH_3)_3SiO_{1/2}$ and $SiO_2$ units (the molar ratio between the both units being 0.8) and having hydroxyl and isopropoxy groups which were bonded to the Si atom and a 50% xylene solution (R-3) of a polymethylvinylsiloxane resin consisting of $(CH_3)_3SiO_{1/2}$ units, $SiO_2$ units and $(CH_2=CH)CH_3SiO$ (the molar ratio among these three units being 0.6:1.0:0.1) and having hydroxyl and isopropoxy groups which were bonded to an Si atom were prepared.

EXAMPLE 1

30.0 parts of siloxane resin solution (R-1), as component (A), prepared in Referential Example was dissolved in 82 parts of a mixture, as component (B), containing 47.0 parts of a liquid polydimethylsiloxane having both of its terminals blocked with trimethylsiloxy groups and viscosity of 50 cSt, and 35 parts of a liquid polydimethylsiloxane having both of its terminals blocked with dimethylhydroxysiloxy groups and viscosity of 10,000 cSt. 3.0 parts of N-β-(aminoethyl)-γ-aminopropyltrimethoxysilane as component (C) was added to the above mixture and dispersed uniformly. Then a homogeneous 50% concentration polyorganosiloxane preparation (S-1) was obtained by adding 185.0 parts of mineral turpentine to the dispersion. In the same manner, preparations (S-2 to S-5) having different compositions and mixing ratios of components (A), (B) and (C) as shown in Table 1 were obtained. The preparations (S-6 to S-8) are those for comparison with those according to this invention.

EXAMPLE 2

8.0 parts of the polyorganosiloxane preparation (S-1) obtained in Example 1 was mixed with 3.0 parts of carnauba wax and 2.5 parts of a sorbitan fatty acid ester as a surface active agent. The mixture was dissolved in 40.0 parts of mineral turpentine and then mixed with 12.0 parts of diatomaceous earth (tradename, Celite Superfroth, Johns-Manville Products Corp.). The resulting mixture was heated to 85° C. to disperse the wax and maintained at a temperature of 85° C. under agitation in a homomixer. To this homomixer was added 60 parts of water heated to 80° C. to obtain a water-in-oil (hereinafter referred to as W/O) emulsion polishing agent (P-1). In the same manner, various emulsion polishing agents (P-2 to P-6) as shown in Table 2 were prepared by using the polyorganosiloxane solutions (S-2 to S-5) obtained in Example 1. In the same manner, the polishing agents (C-1 and C-2) as comparative samples were also prepared by using the solutions (S-6 and S-7).

Each of these emulsion polishing agents was applied to the surface of an iron sheet coated with a melamine resin and dried. The surface was rubbed to form a polished surface which was then tested for gloss, water repellency and their washing resistance according to the following test methods. The results of these tests are shown in Table 2.

Test A: A polishing agent composition was applied to a painted surface and dried at room temperature for 30 minutes. The applied agent was wiped off with a soft cloth. The surface was further rubbed softly to form a polish film on the surface. The sheet thus prepared was used as a test piece (in tests B to E test pieces were also prepared in the same manner). The gloss of the test piece thus prepared was observed with the naked eye.

Test B: A small amount of water was sprayed over a test piece and the water repellency was observed.

Test C: A test piece was washed with a 2% aqueous solution of a neutral detergent. In the same manner as in Test A the gloss of this test piece was observed with the naked eye. The number of times of washing by the time when the test piece lost its gloss was recorded. Here the observation was made every fifth washing time and stopped after the 25th washing.

Test D: A test piece was washed in the same manner as in Test C. Its water repellency was observed in the same manner as in Test B, and the number of times of washing repeated by the time when the test piece lost its water repellency was recorded. Here the observation was made every fifth washing time and stopped after the 25th washing.

Test E: A test piece was rubbed briskly for 2 minutes with cotton cloth moistened with a 2% aqueous solution of a neutral detergent, and then the surface was washed with city water. After repeating these procedures five times the test piece was dried and the gloss of the surface was observed.

EXAMPLE 3

The polishing agents (P-7 to P-9) were prepared by placing the polyorganosiloxane solution (S-1 to S-3) obtained in Example 1 and other components in a ratio shown in Table 2 in a vessel fitted with a reflux condenser, mixing the contents uniformly by heating at 100° C. for 10 minutes and slowly cooling the mixture. The polishing agent (C-3) of the comparative sample was also prepared from the solution (S-8). In the same manner as in Example 2, the gloss, water repellency and their washing resistance were measured. The results of these tests are shown in Table 2.

TABLE 1

| | Amount (parts) | S-1 | S-2 | S-3 | S-4 | S-5 | S-6 (comp.) | S-7 (comp.) | S-8 (comp.) |
|---|---|---|---|---|---|---|---|---|---|
| (A) | [50% xylene solution] | | | | | | | | |
| | polymethylsiloxane resin R-1 | 30.0 | | | 70.0 | 30.0 | | 30.0 | |
| | polymethylsiloxane resin R-2 | | 20.0 | | | | | | |
| | polymethylvinylsiloxane resin R-3 | | | 30.0 | | | | | |
| (B) | liquid dimethylsiloxane having both of its terminals blocked with dimethylhydroxysilyl groups | | | | | | | | |
| | viscosity 100 cSt | | 40.0 | | | | | | |
| | viscosity 10,000 cSt | 35.0 | | 30.0 | 63.0 | 35.0 | | | 95.0 |
| | *liquid dimethylsiloxane having both of its terminals blocked with trimethylsiloxy groups | | | | | | | | |
| | viscosity 5 cSt | | 35.0 | 30.0 | | | | | |
| | viscosity 50 cSt | 47.0 | | 23.0 | | | | | |
| | viscosity 350 cSt | | | | | | 100.0 | 70.0 | |
| | viscosity 10,000 cSt | | | 10.0 | | | | | |
| | liquid methylphenylsiloxane having both of its terminals blocked with trimethylsiloxy groups | | | | | | | | |
| | viscosity 250 cSt | | | | | 47.0 | | | |
| (C) | γ-aminopropyltriethoxysilane | | | 2.0 | | | | | |
| | N—β-(aminoethyl)-γ-aminopropyl-trimethoxysilane | 3.0 | | | 2.0 | 3.0 | | | 5.0 |
| | N—(dimethoxymethylsilylpropyl)-ethylenediamine | | 5.0 | | | | | | |
| | mineral turpentine | 85.0 | 90.0 | 85.0 | 65.0 | 85.0 | | | |

*The phenyl group content is 6 mol % based on Si—bonded organic groups.

TABLE 2

| | Polishing Agent Composition No. | | | | | |
|---|---|---|---|---|---|---|
| Amount (parts) | P-1 | P-2 | P-3 | P-4 | P-5 | P-6 |
| oil-soluble preparation | | | | | | |
| S-1 | 8.0 | | | 8.0 | | |
| S-2 | | 8.0 | | | | |
| S-3 | | | 10.0 | | | |
| S-4 | | | | | 8.0 | |
| S-5 | | | | | | 8.0 |
| S-6 (comparative) | | | | | | |
| S-7 (comparative) | | | | | | |
| S-8 (comparative) | | | | | | |
| carnauba wax | 3.0 | 3.0 | 2.0 | 2.0 | 3.0 | 3.0 |
| sorbitan fatty acid | 2.5 | 2.5 | | | 2.5 | 2.5 |

TABLE 2-continued

| | Polishing Agent Composition No. | | | | | |
|---|---|---|---|---|---|---|
| ester | | | | | | |
| oleic acid | | | 2.0 | 2.0 | | |
| mineral turpentine | 40.0 | 36.0 | 20.0 | 20.0 | 40.0 | 40.0 |
| kerosene | | | | | | |
| abrasive composition | | | | | | |
| diatomaceous earth | 12.0 | 8.0 | 15.0 | 15.0 | 12.0 | 12.0 |
| kaolin clay | | 8.0 | | | | |
| water-soluble preparation | | | | | | |
| water | 34.5 | 34.5 | 50.0 | 52.0 | 34.5 | 34.5 |
| formalin | | | 1.0 | 1.0 | | |
| form of polishing agent | W/O emulsion | W/O emulsion | O/W emulsion | O/W emulsion | W/O emulsion | W/O emulsion |
| test results | | | | | | |
| test A | excellent | excellent | excellent | excellent | excellent | excellent |
| test B | excellent | excellent | excellent | excellent | excellent | excellent |
| test C | >20 | >15 | >15 | >20 | >20 | >20 |
| test D | >20 | >15 | >15 | >20 | >20 | >20 |
| test E | good | good | good | good | good | good |

| Amount (parts) | P-7 | P-8 | P-9 | C-1 (comp.) | C-2 (comp.) | C-3 (comp.) |
|---|---|---|---|---|---|---|
| oil-soluble preparation | | | | | | |
| S-1 | 10.0 | | | | | |
| S-2 | | 10.0 | | | | |
| S-3 | | | 10.0 | | | |
| S-4 | | | | | | |
| S-5 | | | | | | |
| S-6 (comparative) | | | | 4.0 | | |
| S-7 (comparative) | | | | | | 4.0 |
| S-8 (comparative) | | | | | 4.0 | |
| carnauba wax | 20.0 | 20.0 | 20.0 | 3.0 | 2.0 | 20.0 |
| sorbitan fatty acid ester | | | | 2.5 | | |
| oleic acid | | | | | 2.0 | |
| mineral turpentine | | | | 40.0 | | |
| kerosene | 70.0 | 70.0 | 70.0 | | | 76.0 |
| abrasive composition | | | | | | |
| diatomaceous earth | | | | 12.0 | 15.0 | |
| kaolin clay | | | | | | |
| water-soluble preparation | | | | | | |
| water | | | | 34.5 | 52.0 | |
| formalin | | | | | 1.0 | |
| form of polishing agent | paste solid wax | paste solid wax | paste solid wax | W/O emulsion | O/W emulsion | paste solid wax |
| test results | | | | | | |
| test A | excellent | excellent | excellent | excellent | excellent | excellent |
| test B | excellent | excellent | excellent | excellent | excellent | excellent |
| test C | >25 | >25 | >25 | >5 | >5 | >5 |
| test D | >25 | >25 | >25 | >5 | >5 | >5 |
| test E | excellent | excellent | excellent | bad | bad | good |

I claim:

1. A polishing agent composition containing a polyorganosiloxane preparation comprising:
   (A) from 4 to 40% by weight of a benzene soluble polyorganosiloxane resin comprising:
      (1) 70 to 100 mole percent, $(R^1)_3SiO_{1/2}$ units and $SiO_2$ units, and
      (2) 0 to 30 mole percent $(R^2)_2SiO$ units and having Si bonded $OR^3$ groups wherein $R^1$ and $R^2$ represent the same or different substituted or unsubstituted monovalent hydrocarbon groups and $R^3$ represents a hydrogen atom or a monovalent hydrocarbon group of from 1 to 6 carbon atoms;
   (B) from 55 to 95% by weight of a liquid linear or branched polyorganosiloxane terminated by $(HO)(R^4)_2SiO_{1/2}$ units or $(R^4)_3SiO_{1/2}$ units, and whose units other than the terminal units comprise 90 to 100 mole percent $(R^5)_2SiO$ units and 0 to 10 mole percent $(R^5)_aSiO_{4-a/2}$ units where a equals 0 or 1, $R^4$ and $R^5$ represent the same or different substituted or unsubstituted monovalent hydrocarbon groups; and
   (C) from 1 to 5% by weight of an amino group-containing alkoxysilane represented by the general formula:

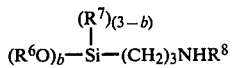

wherein $R^6$ represents an alkyl group of from 1 to 4 carbon atoms, $R^7$ represents a substituted or unsubstituted monovalent hydrocarbon group, $R^8$ represents a hydrogen atom or an amino group-terminated aminoalkyl group of from 1 to 10 carbon atoms and b represents 2 or 3.

2. A polishing agent composition as in claim 1, wherein $R^1$ is methyl.

3. A polishing agent composition as in claim 1, wherein the amount of the $(R^1)_3SiO_{1/2}$ unit per mol of the $SiO_2$ unit of component (A) is in the range of from 0.4 to 1.0 mol.

4. A polishing agent composition as in claim 1, wherein the terminal groups of component (B) are dimethylhydroxysiloxy groups.

5. A polishing agent composition as in claim 1, wherein the terminal groups of component (B) are trimethylsiloxy groups.

6. A polishing agent composition as in claim 1 wherein component (B) comprises a mixture of a liquid polyorganosiloxane whose terminal groups are dimethylhydroxysiloxy groups and a liquid polyorganosiloxane whose terminal groups are trimethylsiloxy groups.

7. A polishing agent composition as in claim 1, wherein $R^5$ of component (B) represents a methyl group.

8. A polishing agent composition as in claim 1, wherein component (B) comprises a linear polydiorganosiloxane.

9. A polishing agent composition as in claim 1, wherein the viscosity of component (B) at 25° C. is in the range of from 10 to 10,000 cSt.

10. A polishing agent composition as in claim 1, wherein a mixture prepared by premixing and dissolving said component (A) in said component (B) is employed.

11. A polishing agent composition as in claim 1, wherein there is utilized from 10 to 20% by weight of component (A), 76 to 88% by weight of component (B) and 2 to 4% by weight of component (C).

* * * * *

UNITED STATES PATENT AND TRADEMARK OFFICE
CERTIFICATE OF CORRECTION

PATENT NO. : 4,462,828
DATED : July 31, 1984
INVENTOR(S) : Masaaki Otsuki

It is certified that error appears in the above-identified patent and that said Letters Patent is hereby corrected as shown below:

On the cover page, after "Assignee", please delete "General Electric Company, Waterford, N.Y." and insert therefor -- Toshiba Silicones Limited, Tokyo, Japan --.

Signed and Sealed this

Nineteenth Day of February 1985

[SEAL]

Attest:

DONALD J. QUIGG

Attesting Officer

Acting Commissioner of Patents and Trademarks